UNITED STATES PATENT OFFICE.

WILLIAM E. VARY, OF DE WITT, IOWA.

IMPROVEMENT IN PAINT-OILS.

Specification forming part of Letters Patent No. 179,235, dated June 27, 1876; application filed March 4, 1876.

*To all whom it may concern:*

Be it known that I, WILLIAM E. VARY, of the town of De Witt, in the county of Clinton and State of Iowa, have invented certain new and useful Improvements in Preparing Linseed-Oil (raw or boiled) to be mixed with Paints; and I do hereby declare that the following is a full, clear, and exact description thereof, which will enable others skilled in the art to which it appertains to make and use the same.

This invention relates to the preparation of linseed-oil, preparatory to mixing the same with paints; and it consists in mixing certain ingredients hereinafter specified with cold or boiled linseed-oil.

I will proceed to describe the compounding and mixing of my invention.

To two (2) pounds of unslaked lime add six (6) quarts of soft water. Stir them thoroughly, and let them stand until settled. Then pour off four quarts of the liquor without disturbing the sediments. To this four quarts add two (2) ounces sulphate of zinc, and, as soon as dissolved, shake thoroughly, and then add four (4) quarts of pure linseed-oil, either raw or boiled. Shake well, and the mixture is ready to mix with paint or paints.

This mixture of lime, soft water, and sulphate of zinc, when mixed with pure linseed-oil, in equal parts of the mixture and linseed-oil, will make a better body, will give a better gloss, and will last better and longer, retain luster longer, and will be less liable to flake or crack, will spread easier and evener, and will make a saving of at least twenty-five (25) per cent. in the amount of paint used in work, giving at the same time an elastic and springy surface; and this mixture or oil will avoid the necessity of the use of driers; and, further, the mixture of lime, water, sulphate of zinc, and linseed-oil will not separate or divide by standing.

The mixture of lime, water, sulphate of zinc, and linseed-oil is to be mixed with paints in the usual manner of mixing the linseed-oil by itself.

What I claim as my invention, and desire to secure by Letters Patent of the United States, is—

The within-described compound, consisting of lime, water, sulphate of zinc, and linseed-oil, mixed with paints, substantially as and for the purpose set forth.

In testimony that I claim the foregoing as my own I affix my signature in presence of two witnesses.

WILLIAM E. VARY.

Witnesses:
 PITKIN C. WRIGHT,
 E. CHRISTIANSEN.